United States Patent [19]

Bray

[11] 4,156,645

[45] May 29, 1979

[54] CONVERSION OF SEA WATER BY REVERSE OSMOSIS

[75] Inventor: Donald T. Bray, Escondido, Calif.

[73] Assignee: Desalination Systems Inc., Escondido, Calif.

[21] Appl. No.: 861,271

[22] Filed: Dec. 16, 1977

Related U.S. Application Data

[63] Continuation-in-part of Ser. No. 382,909, Jul. 26, 1973, abandoned.

[51] Int. Cl.$^2$ ............................................. B01D 13/00
[52] U.S. Cl. ............................... 210/23 H; 210/433 M
[58] Field of Search ................... 210/23, 321, 500 M, 210/22, 433 M, 493 M, 497.1

[56] References Cited

U.S. PATENT DOCUMENTS

| | | | |
|---|---|---|---|
| 3,457,170 | 7/1969 | Havens | 210/23 |
| 3,839,201 | 10/1974 | Miller | 210/23 X |

OTHER PUBLICATIONS

New Separation Techniques for the CPI, Michaels, CEP, 12/68, pp. 31–43.

*Primary Examiner*—Ferris H. Lander
*Attorney, Agent, or Firm*—Clement H. Allen

[57] ABSTRACT

A process for recovery of fresh water by reverse osmosis from high salt content feed, such as sea water, comprises treating the feed water in an initial stage at relatively low pressure (between about 300 and 550 psi) employing a loose semipermeable membrane, to produce an intermediate product water containing one-fourth to one-half the TDS (total dissolved solids) content of the original feed water. The intermediate product water is treated in a subsequent stage also at a relatively low pressure (between about 300 and 550 psi) employing a tight semipermeable membrane, to produce a fresh product water containing less than 2,000 ppm TDS, and preferably a potable water containing less than 1,000 ppm TDS.

9 Claims, No Drawings

CONVERSION OF SEA WATER BY REVERSE OSMOSIS

CROSS REFERENCE

This application is a continuation-in-part of my copending application, Ser. No. 382,909, filed July 26, 1973, and now abandoned.

BACKGROUND OF THE INVENTION

1. The Field of the Invention

This invention relates to the recovery of fresh or potable water from a high salt content feed solution, such as sea water, by reverse osmosis.

2. The Prior Art

Reverse osmosis has emerged from its previous status as a scientific curiosity to a practical reality. Its commercial use, however, has thus far been generally in equipment for purifying brackish and relatively low solute content waters. Problems arise in purifying sea water because of the high pressures required, the corrosive nature of sea water, and the need for a very low by-pass type membrane assembly. High pressure results in compaction of the membrane, which lowers the membrane water flux performance, and requires use of expensive, high-strength components which, even with technically successful units, has resulted in high capital costs.

Two general approaches have been proposed or tried for conversion of sea water by reverse osmosis. One approach has been to attempt to convert sea water in one stage directly to fresh or potable water. This has required high pressures (of the order of 800 to 1,200 psi or more) and very tight membranes to provide the salt rejection required, i.e., over 99%, in order to reduce the nominal 35,000 ppm TDS (total dissolved solids) content in the original sea water to, for example, below 1,000 or 500 ppm, which is acceptable as potable water. Purified water flux through such tight membranes is lowered, hence, membrane life is sharply curtailed by compaction caused by the extremely high pressure. An advantage of this approach is that, under the right conditions, a single stage sea water conversion unit might be built at less capital cost than a two stage plant which requires essentially duplicate equipment and generally a somewhat greater amount of total membrane area, since the feed water must pass through two membranes before reaching the desired product quality. This is somewhat offset by designing for higher unit water fluxes in the two stage units.

Multiple stage plants heretofore employed or proposed have employed tight membranes (rejection of 95% or higher) and high pressure (of the order of 800 psi to 1,200 psi) in a first stage to produce an intermediate product water containing in the order of 2,500 to 5,000 ppm TDS, which can be readily treated in a second stage as a type of brackish water. The first stage product flux under these conditions has been greater than in the single stage design, and the intermediate product water can be treated by commercially available reverse osmosis units and membranes used for treating brackish water. This type of two stage process, however, still suffers from the high pressure, expensive construction material, and membrane life problems of the single stage design; and additionally must bear the additional capital cost of the second stage equipment.

Typical of such operation is the process described in U.S. Pat. No. 3,457,170, in which a pressure of 800 psi is employed in the first stage and a pressure of 500 psi is employed in the second stage. Quite distinct from this, Applicant employs low pressures within similar ranges for both stages, rather than the high pressure first stage and lower pressure following stage, and eliminates the need for any operation above about 550 psi. Moreover, Applicant employs a loose type of membrane in his first stage and a tight membrane in his second stage, which is counter to prior art teachings that tight membranes and high pressures should be employed for treatment of high salt content solutions.

The process of this invention solves problems encountered in prior art sea water conversion processes and makes possible use of low pressures and inexpensive materials in a multiple stage process to realize extended membrane life, improved production rates, and low cost.

SUMMARY OF THE INVENTION

Summarized briefly, this invention comprises a multi-stage reverse osmosis process for converting a saline feed solution containing about 28,000 to 40,000 ppm TDS (total dissolved solids) to water containing less than 2,000 ppm TDS, and preferably potable water of less than 1,000 ppm TDS.

In the initial or first stage, the salinity of the feed solution is reduced to produce an intermediate product water or permeate containing from one-fourth to one-half the total dissolved solids content of the feed solution, employing an operating pressure of between about 300 and 550 psi, and employing a loose semipermeable membrane characterized by a membrane constant between about $4 \times 10^{-5}$ and $15 \times 10^{-5}$ g/cm$^2$ sec atmos, preferable between about $6 \times 10^{-5}$ and $15 \times 10^{-5}$ g/cm$^2$ sec atmos.

In a subsequent or second stage, the intermediate product water or permeate from the initial stage is employed as the feed solution and its total dissolved solids content is reduced to produce a final product water permeable containing less than 2,000 ppm TDS, and preferably less than 1,000 or even 500 ppm TDS, employing an operating pressure of between about 300 and 550 psi and employing a tight semipermeable membrane characterized by a membrane constant between about $2 \times 10^{-5}$ and $4 \times 10^{-5}$ g/cm$^2$ sec atmos.

Preferred operating pressures are between about 400 and 550 psi for both stages.

The apparatus employed, including the pumps with required capabilities, and semipermeable membranes of critical characteristics as specified, results in efficient operating of both initial and subsequent stages at pressures low enough to avoid deterious compaction of the membranes, and to permit employment of low cost construction materials while maintaining a high production rate of purified or potable final product water.

DESCRIPTION OF PREFERRED EMBODIMENTS

The reverse osmosis process of this invention may be applied to the treatment of a solution containing a high solute content and which is not amenable to reverse osmosis processes heretofore used for purification of brackish waters, most of which contain up to about 5,000 ppm, more or less, TDS (total dissolved solids). The process of this invention is useful for purifying solutions containing from about 28,000 to 40,000 ppm TDS to reduce their salinity to below 2,000 ppm TDS, which may be considered a useful grade of fresh water, and preferably below 1,000 ppm TDS, or as low as 500 ppm TDS, to meet public health standards for potable water. Sea water is a highly saline solution, available in unlimited quantities and contains generally about 35,000 ppm TDS.

The initial or first stage of the process of this invention is operated at an operating pressure between about 300 and 550 psi. This pressure range is critical because at operating pressures above 550 psi, membranes, even of most modern type, tend to compact and show serious loss of solute separation efficiency, while pressures below 300 psi will not produce acceptable flux rates for commercial applications. Additionally, 550 psi is about the maximum pressure that can be used in apparatus fabricated of many relatively low cost materials such as even recently developed plastics.

The subsequent or second stage of the process of this invention is also operated at an operating pressure between about 300 psi and 550 psi, and this range is also critical for the same reasons as those for initial stage membranes operation. Preferred operating pressures are between about 400 and 550 psi for both initial and subsequent stages. The higher pressures within the broad range provides proportionately greater driving force, that is the difference between the osmotic pressure difference between the original feed and intermediate product water and the final product water, and the subsequent stage module operating pressure. Thus, for example, a $\Delta \pi$ (difference between osmotic pressure of feed and osmotic pressure of product water) of 180 psi subtracted from an operating pressure of 300 psi will provide a driving force of 120 psi, but an operating pressure of 500 psi will provide a driving force of 320 psi against the same $\Delta \pi$. The driving force increase is more critical in the initial stage where the osmotic pressure of the feed solution is extremely high.

The characteristics of the membranes employed in the initial and subsequent stages are also essential and critical in the process of this invention. The initial stage membrane may be fabricated of any suitable material (and a number of such materials are known in the art) provided its membrane constant is between about $4 \times 10^{-5}$ and $15 \times 10^{-5}$ g/cm$^2$ sec. atmos. and preferably between about $6 \times 10^{-5}$ and $15 \times 10^{-5}$ g/cm$^2$ sec. atmos. with suitable salt rejection. This constant, representing an indication of the salt rejection and flux of a membrane tested under standard conditions at various pressures, is, in the art, taken as the water permeation constant discussed in Ulrich Merten's book, Desalination by Reverse Osmosis, published by the M. I. T. Press, 1966, particularly Chapter 1, Section 2.4 pages 44 to 51. It is a more scientific and precise indicator of membrane operating capabilities than the salt rejection and gallons per square foot per day criteria often employed. A constant between about $4 \times 10^{-5}$ g/cm$^2$ sec. atoms. and $15 \times 10^{-5}$ g/cm$^2$ sec. atmos. will correspond generally to a membrane salt rejection of between about 80% and 40%, and water flux in the range of 6 to 25 gallons per square foot per day of membrane area employing a 1,000 ppm NaCl feed solution at 100 psi pressure. Membranes of lower membrane constant than about $4 \times 10^{-5}$ g/cm$^2$ sec. atmos. will not produce sufficient water flux to provide useful volumes of intermediate product water in an initial stage, while membranes of membrane constant higher than $15 \times 10^{-5}$ g/cm$^2$ sec. atmos. will not provide sufficient salt rejection to reduce the feed TDS content to between one-quarter and one-half of its originally high level. Membranes for the subsequent stage must have a lower membrane constant, that is between about $2 \times 10^{-5}$ and $4 \times 10^{-5}$ g/cm$^2$ sec. atmos., which will ensure a salt rejection of over 90%, to provide final product water below 2,000 ppm TDS at reasonable flux rates.

For an initial stage, a membrane of membrane constant between about $6 \times 10^{-5}$ and $15 \times 10^{-5}$ g/cm$^2$ sec. atmos. is preferred because such a membrane will produce a greater flux (volume of intermediate product water) while still reducing the total solids content of the highly saline feed to from one-quarter to one-half of its original content.

Table 1, which follows, provides examples illustrating the practice of the process of this invention. A first or initial stage spiral wound membrane cartridge, identified as E639, contained a semipermeable membrane of membrane constant of $14 \times 10^{-5}$ g/cm$^2$ sec. atmos. Tested at 100 psi operating pressure using a 1,000 ppm NaCl feed solution, it showed a salt rejection of 68%, which would support its general classification as a "loose" membrane. A second or subsequent stage spiral wound membrane cartridge, identified as 790, contained a semipermeable membrane of membrane constant of $2.1 \times 10^{-5}$ g/cm$^2$ sec. atmos. Tested at 100 psi operating pressure using a 1,000 ppm NaCl feed solution, it showed a salt rejection of 90.1%, which would support its classification as a "tight" membrane.

TABLE 1

1st Stage

Feed - Filtered sea water of 35,000 ppm.
Membrane - Cellulose triacetate. Membrane constant 14 × 10$^{-5}$g/cm$^2$ sec. atmos. Salt rejection 68% at 100 psi using 1000 ppm NaCl test solution. Cartridge E 639.

| Operating Pressure | Intermediate Product Water Flux | Salt Rejection | Intermediate Product Water Salt Content |
|---|---|---|---|
| 308 psi | 14.9 gal/ft$^2$day | 58.4% | 15,000 ppm TDS |
| 360 | 19.2 | 63.6 | 13,100 |
| 402 | 21.9 | 64.8 | 12,900 |

2nd Stage

Feed - 15,000 ppm TDS intermediate product from 1st stage.
Membrane - Cellulose diacetate, heat treated. Membrane constant 2.1 × 10$^{-5}$g/cm$^2$ sec. atmos. Salt rejection 90.1% at 100 psi using 1000 ppm NaCl test solution. Cartridge 790.

| Operating Pressure | Product Water Flux | Salt Rejection | Product Water Salt Content |
|---|---|---|---|
| 302 psi | 6.5 gal/ft$^2$day | 93.9% | 644 ppm TDS |
| 350 | 7.9 | 95.1 | 511 |
| 400 | 9.74 | 95.7 | 455 |
| 448 | 11.1 | 95.7 | 448 |

It will be seen from Table 1 that the process of this invention can produce first stage intermediate product water permeate containing from 12,900 to 15,000 ppm TDS (between one-fourth and one-half that of the 35,000 ppm sea water feed) at operating pressures of 308 to 402 psi (within the range of 300 to 550 psi), producing 14.9 to 21.9 gallons per square foot of membrane area per day. It will also be seen that the second stage can produce final product water permeate containing 644 to 448 ppm TDS (less than 1,000 ppm, and less than 500 ppm TDS, respectively) at operating pressure of 302 to 448 (within the range 300 to 550 psi) producing 6.5 to 11.1 gal/ft$^2$ of potable water.

The membranes employed in the practice of this invention are of the reverse osmosis type and depend for transport of solvent through the membrane on pressure applied to reverse a normal osmotic flow. They are not of the type employed for ultrafiltration, which provides high flux at relatively low operating pressure, but which act in the nature of a sieve for retaining large and high molecular weight ions and small particles, while allowing flow-through of solvent. While membranes of cellulose triacetate and heat treated cellulose diacetate have been described for membranes for the first and second stages, respectively, membranes made from other materials such as polyamides, polyimides and ethyl cellulose, and which may or may not be heat treated, may be employed provided they have equivalent operating characteristics indicated by the membrane constant expressed as employed herein as grams of permeate produced per square centimeter of membrane area per second per atmosphere of pressure applied. Membranes of cellulose triacetate or blends of cellulose di- and triacetate of average 41% acetyl will be suitable for initial stage membrane material; and these, if desired, may be partially heat treated, say at about 75° C. For subsequent stage membrane material, fully heat treated (85°-90°) cellulose diacetate of 39.8% acetyl content will be found satisfactory.

The operating pressure ranges for the initial and subsequent stages of the process of this invention in combination with the semipermeable membranes of particular characteristics described are critical to obtain the improved operation as shown in the examples of Table 1. Lower than about 300 psi operating pressure will not generate sufficient driving force to produce adequate flux of the intermediate product water through the loose membrane employed in the initial stage, nor will this pressure produce adequate flux through the tight membrane of the subsequent stage. Higher than 550 psi operating pressure may initially produce higher flux rates temporarily, but membrane compaction increased so that initial high production will be substantially reduced after a few weeks or months of operation. This effect, and the criticality of the 550 psi upper limit is especially important in the initial stage in which the loose type membrane has been found to be even more susceptible to compaction and loss of operating efficiency at pressures over 550 psi. Additionally, for both initial and subsequent stages, operation not above 550 psi permits safe use of known standard components with operating experience, and further allows many parts of the apparatus to be fabricated of inexpensive through strong and corrosion resistant plastic materials, thus saving substantial expense for strong and corrosion resistant metal alloys such as stainless steel.

Applicant's process and the apparatus employed provide a novel approach to purification of highly saline solutions such as sea water to produce a fresh water product of generally under 2,000 ppm TDS. It has heretofore been considered that to purify such a solution, a driving pressure for efficient separation must exceed the osmotic pressure of the solute in the solution; and to provide a potable water product, or an initial stage intermediate product of low salt content, a membrane of very high salt rejection characteristics would have to be employed. But Applicant proceeds counter to these principles. He has discovered that a loose membrane can be operated at low pressure (300-550 psi) to produce a relatively high salt content intermediate product water permeate (one-fourth to one-half salt content of the feed); and that this intermediate product water can be treated using a tight membrane also at low pressure to produce a less than 2,000 ppm TDS final product permeate. Operation of the initial stage is unique in that efficient operation may be achieved even when the operating pressure is below the osmotic pressure of the salt in the original feed solution, which is about 365 psi for sea water; pressures as low as 308 psi produced efficient separation as seen in Table 1 above. Even when pressures in the upper and preferred portion of the recited pressure range are employed, that is between about 400 and 550 psi, the net driving force above the 365 psi previously accepted minimum is only 35 to 185 psi. The basic reason for efficient operation at these lower operating pressure is that a loose membrane is employed to produce a relatively high salt content initial stage permeate, that is one containing from about one-quarter to one-half that of the feed solution salt content. This may be as high as about 20,000 ppm, or 17,500 ppm for a 35,000 ppm sea water feed. Under these conditions, the necessary driving force to reduce 35,000 ppm to 17,500 ppm, for example, is very much less than that required to reduce the feed to what has been heretofore considered substantially purified permeate containing say a few hundred ppm, or at most, a few thousand ppm TDS. Therefore, when using a loose initial stage membrane, the practical driving force requirement is not based on the osmotic pressure of the solute in the feed, but the difference between the osmotic pressure of the solute in the feed and the osmotic pressure of the solute in the permeate (the intermediate product water). Thus, using again the example of a sea water feed of 35,000 ppm TDS reduced to 17,500 ppm in the initial stage, the osmotic pressure of the solute in the feed would be 365 psi, but the osmotic pressure of the solute in the permeate would be about 180 psi leaving a required minimum driving force of only about 185 psi. As a result, the pressure range of this invention of between about 300 and 550 psi is seen to provide adequate driving force over and above the necessary minimum for initial stage operation, employing the specified type of membrane to produce the specified salt content permeate. In a subsequent stage, a tight membrane of low membrane constant (high salt rejection) can produce efficient purification of the first stage intermediate product water, particularly in the higher portion of the pressure range defined.

In an additional embodiment of this invention, the initial stage may be operated at a pressure somewhat below 550 psi until the semipermeable membrane output rate falls to a predetermined proportion of its initial steady state rate. Then the operating pressure is raised periodically and incrementally to restore membrane output rate until an operating pressure of about 550 psi is reached. This procedure ensures longest operating periods at lowest pressure to produce a desired output rate, and results in substantial increase in overall useful membrane life. For example, operation using a sea water feed for the initial stage according to the examples in Table 1, at about 400 psi could produce up to 25 gallons of intermediate product per square foot of membrane area per day. When, due to normal deterioration, membrane output drops to a predetermined value, say 90% of an original 25 gallons per square foot per day, operating pressure is raised by about 25 to 50 psi to restore the original output rate. After another period of operation when output has fallen again to about 90%, another incremental increase in pressure is employed for an additional period. Periodical and incremental pressure increases are employed until a final operating pressure of 550 psi is reached. After a long period at this pressure, fall in output to 90% signals the gradually approaching end of the membrane useful life. The total membrane life under these conditions is, however, longer than if initial and continued operation had been at a steady state higher pressure. The pressure increase increment has been selected as described above at about 25 to 50 psi; however, the increment (and corresponding period of operation) may be of any useful magnitude and may be reduced to a small fraction to produce essentially continuous correction obtained by suitable automatic control apparatus, as will be obvious to those skilled in the art.

Several advantages accrue in the practice of the process of this invention. Employment of lower pressure, especially in the first stage, and also in the second stage, permits use of a tremendous amount of experience that has been accumulated in employment of such pressures in treatment of brackish water by reverse osmosis. Materials, pressure vessels, membrane design and construction, membrane cartridge design and assembly, and instrumentation, for example, have all been well developed for brackish water plants of commercial size and large capacity operating in the range of about 500 to 600 psi. Pressures from about 300 to 550 psi also allow use of more widely available and often less expensive materials of construction than are required for operation at 800 psi and above. Many components can be fabricated of modern high strength plastics instead of more expensive and heavier metal alloys, such as stainless steel. Pumps have been designed and developed particularly for the brackish water pressure range and millions of hours of operating experience is available. Pumps for a higher pressure range are most often modified to satisfy these requirements at increased cost and with limited operating experience. It is of significant advantage therefore that the first stage of Applicant's process can successfully treat high solute feed (such as sea water) at low pressures heretofore employed for feed in a radically lower range of salt content.

Low pressure operation of the initial stage of this invention is especially valuable in its effect on membrane life, that is the ability to maintain operating efficiency over a long period of time. All asymmetric reverse osmosis membranes, as of cellulose acetate and other materials such as polyamides, sulphones, etc., encounter some compaction effects at pressures above 400 psi. These effects become severe at about 600 psi and even more severe at pressure of 800 psi and above. This effect may be illustrated by a so-called compaction curve which is well known in the art and has been described in published technical literature. A compaction curve shows the reduction in membrane efficiency represented by water flux rate, for operation at various pressures over an extended period of time. Such curves show straight lines on a log-log plot in which the flux of a typical membrane is plotted against time. Such compaction curves show very clearly that up to about 400 psi the compaction curve is substantially level and no significant reduction of flux occurs even after long periods of time. At about 550 psi at 10,000 hours (almost a year), compaction has affected the flux so that only about 60–70% of the initial flux is being produced. This is about the limit of commercial acceptability. At pressures higher than about 550 psi, for example 600 psi, the flux after 10,000 hours is approaching about 50% of the initial flux. The exact slope of curves for specific membranes and conditions (such as temperature) may differ but the general effect is the same. Because of difficulty of operating at pressures of the order of 800 psi and higher, and the extremely short membrane life due to premature compaction, little long life data is available for these conditions.

When membranes of the type and characteristics specified are operated in a multi-stage process as described, an expected membrane life of at least a number of thousand hours should be obtained.

I have also found that low pressures employed in according to this invention makes possible the use of an extremely valuable type of backing or spacer material employed in so-called spiral wound cartridges. This material is a plastic tricot fabric which is effective and available at reasonable cost and is efficient at pressures below 600 psi but cannot be effectively used at pressures of about 600 psi and above. Employment of pressures in the 300 to 550 psi range of this invention avoids additional costs for thicker and more expensive spacer material and probably requires greater unit volume for equivalent area. It is to be stressed that applicant's low pressure ranges employed in his multi stage process must be used in conjunction with the specific membranes described to provide the capability of reducing the salinity of the feed to between one-fourth and one-half its original salt content in the first stage and down to less than 2,000 ppm TDS in a subsequent stage.

All reverse osmosis cartridge (for example a spiral wound "cartridge" consists of membrane, spacer and permeate transfer leaves spirally wound around a central permeate collector tube) are subject to certain mechanical failures such as leakage and fouling even though these may be very small. Leakage is considered to be the amount of flow through defects of such size and type that no salt separation occurs. These may be very small holes or cracks in spiral wound cartridges, or broken fibers in hollow fine fiber cartridges. Cartridges of the current state of the art, used for brackish water, will show leakage rates of from 1 to about 2%. For special uses, such as conversion of sea water in a one stage process or a high pressure first stage of a two stage process, or high bacteria removal (e.g. 3 log reduction) it is necessary to reduce the cartridge leakage to about 0.1%, that is only 0.1% of the feed may pass through content. This degree of performance has not yet been achieved on an acceptable yield basis.

Considering a 1,000 psi single stage sea water conversion with a 99.2% conductivity reduction, which is a typical value, the permeate quality will show the following values for differring leakage conditions.

| Leakage | Permeate PPM Through Membrane | Permeate PPM Through Leakage | Total Permeate PPM |
|---|---|---|---|
| 0% | 400 | 0 | 400 |
| 0.1% | 400 | 50 | 450 |
| 1% | 400 | 500 | 900 |

Thus a 1% leakage cannot be tolerated since the ppm of the permeate will be doubled over that obtainable for 0.1% leakage and a product of 500 ppm TDS cannot be obtained. As can be seen, the amount of leakage allowable is extremely small.

In the two stage process of this invention using the same sea water feed and operated at 500 psi both stages, with 50% water recovery, and 80% salt rejection in the first stage, and 98.5% rejection in the second stage (both typical examples) the average salt concentration of the feed-brine will be about 50,000 ppm in the first stage and about 15,000 ppm in the second stage. The leakage effect is shown below:

| Leakage | | 2nd Stage Permeate PPM | | Total Permeate ppm |
|---|---|---|---|---|
| 1st Stage | 2nd Stage | thru membrane | thru leakage | |
| 0% | 0% | 225 | 0 | 225 |
| 0.1% | 0.1% | 225 | 23 | 248 |
| 1% | 1% | 225 | 153 | 378 |
| 10% | 1% | 375 | 153 | 528 |

Thus a two stage system according to this invention can tolerate up to about 1% leakage in both 1st and 2nd stages can still achieve a high grade potable water product of less than 500 ppm. Furthermore the 1st stage can be operated with a 10% leakage and still almost meet the 500 ppm high purity water criterian. This is obviously a tremendous improvement over the low leakage tolerance of the high pressure single stage process, which is shown previously can only tolerate about 0.1% leakage. Moreover the critical leakage rate for the second stage may be up to about 1%, and for this specification the membrane and its cartridge may be essentially the same as for current brackish water cartridges used in substantial numbers.

The two stage process of this invention additionally makes possible greater freedom in selecting membrane types. It is much easier to make a membrane of about 90% rejection, for example, than one of say over 99% rejection required for high purity water production in a single stage. The measure of difference in difficulty is the percent salt transmission allowed, which would be about 10% compared to about 1%. Since the salt transmission may be relatively high in the first stage of the process of this invention and is not unduly restricted even in the second stage, a number of types of membranes may be employed with satisfactory efficiency and produced with acceptable difficulty.

The capital costs of the single compared to the multiple stage process may be about the same, the increased cost for the higher pressure pumping equipment in a single stage may be offset by the cost of the larger number of cartridges used in a two stage system. However, in the process of this invention, lower pressures in both stages may effect economies, and similar pressures required for both stages may produce a significant saving in requirements for spare parts, maintenance, and for maintenance for stand-by pumping units operating at the same or similar pressures. While these advantages are obtained when both stage pressures are substantially the same, an alternative, but none the less important advantage, may accrue if the subsequent stage operating pressure is higher than the initial stage operating pressure, and sufficiently higher so that the concentrate from the subsequent stage (or a portion of it) may be returned to an mixed with the already pressurized feed introduced into the initial stage without additional pressurization. For example if a subsequent stage is operated at 550 psi and the initial stage is operated at 500 psi, concentrate released from the subsequent stage at say 515 psi may be introduced directly into the pressurized feed entering the initial stage. Because the second stage concentrate pressure will be higher than the initial stage entering feed pressure, no additional pressurization will be required to recycle subsequent stage concentrate, resulting in a substantial saving of recycle pumping power.

I claim:

1. A multistage reverse osmosis process for converting a saline feed solution containing about 28,000 to 40,000 ppm TDS to water containing less than 2,000 ppm TDS; in which the improvement comprises:
   a. in an initial stage reducing the salinity of the feed solution by reverse osmosis to produce an intermediate product water containing from one-fourth to one-half the total dissolved solids content of the original feed solution at a flux of at least about 6 gallons per square foot of membrane area per day by employing an operating pressure between about 300 and 550 psi, and a loose semipermeable membrane characterized by a membrane constant between about $4 \times 10^{-5}$ and $15 \times 10^{-5}$ g/cm$^2$ sec. atmos.; and
   b. in a subsequent stage reducing the salinity of the intermediate product water from the initial stage to produce a final product water containing less than 2,000 ppm total dissolved solids employing an operating pressure between about 300 and 550 psi and a tight semipermeable membrane characterized by a membrane constant between about $2 \times 10^{-5}$ and $4 \times 10^{-5}$ g/cm$^2$ sec. atmos.

2. A multistage reverse osmosis process according to claim 1, in which the said initial stage loose semipermeable membrane is characterized by a membrane constant between about $6 \times 10^{-5}$ g/cm$^2$ sec. atmos. and $15 \times 10^{-5}$ g/cm$^2$ sec. atmos.

3. A multistage reverse osmosis process according to claim 1, in which said initial stage operating pressure is between about 400 and 550 psi.

4. A multistage reverse osmosis process according to claim 1, in which said initial stage operating pressure is between about 400 and 550 psi and said subsequent stage operating pressure is between about 400 and 550 psi.

5. A multistage reverse osmosis process according to claim 1, in which the said initial stage is operated at a pressure below 550 psi until the permeate output rate of said initial stage semipermeable membrane falls to a predetermined proportion of its initial steady state rate, and then the operating pressure is raised periodically and incrementally to restore permeate output rate until said pressure reaches about 550 psi.

6. A multistage reverse osmosis process according to claim 1, in which the operating pressure employed in said initial stage is substantially the same as the operating pressure employed in said subsequent stage.

7. A multistage reverse osmosis process according to claim 1, in which the operating pressure employed in said subsequent stage is sufficiently higher than the operating pressure employed in said initial stage so that concentrate released from said second stage can be returned into the pressurized feed of said initial stage without additional pressurization.

8. A multistage reverse osmosis process according to claim 1, in which the leakage rate of a membrane cartridge employed in said initial stage is up to about 10% and the leakage rate of a membrane cartridge employed in said subsequent stage is up to about 1%.

9. A multistage reverse osmosis process according to claim 8, in which the leakage rate of a membrane cartridge employed in said initial stage, and of a membrane cartridge employed in said subsequent stage, is up to about 1%.

* * * * *